Figure 1:
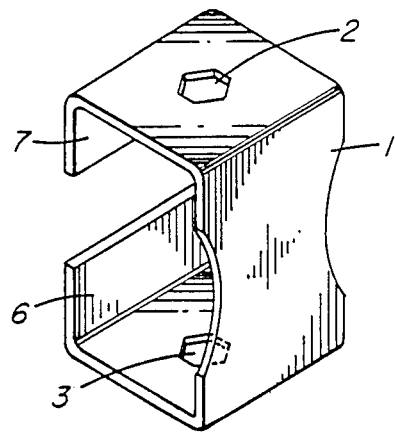

United States Patent [19]

Smith

[11] Patent Number: 4,809,820

[45] Date of Patent: Mar. 7, 1989

[54] PORTABLE SLACK ADJUSTER LOCK

[76] Inventor: Eldon C. Smith, S-16D C-52 R.R. #3, McCulloch Road, Kelowna, British Columbia, Canada, V1Y 7R2

[21] Appl. No.: 159,348

[22] Filed: Feb. 23, 1988

[30] Foreign Application Priority Data

Feb. 27, 1987 [CA] Canada .................................. 530,868

[51] Int. Cl.⁴ ............................................. F16D 66/48
[52] U.S. Cl. .............................. 188/79.55; 188/196 M
[58] Field of Search ................ 188/79.55, 196 M, 265, 188/382

[56] References Cited

FOREIGN PATENT DOCUMENTS 448772 4/1968 Switzerland ..................... 188/79.55
982457 2/1965 United Kingdom ............. 188/79.55

Primary Examiner—Duane A. Reger
Attorney, Agent, or Firm—Pascal & Associates

[57] ABSTRACT

A portable slack adjuster lock in the form of a C-shaped spring metal clamp. The lock clips over the adjusting nut of the internal worm shaft of a slack adjuster, and stops the adjusting nut from turning to prevent loosening of the slack adjuster during normal usage. A hexagonal hole in punched in the slack adjuster lock for fitting over and locking the adjusting nut, and the lock is made preferably from banding steel or plastic.

19 Claims, 1 Drawing Sheet

PORTABLE SLACK ADJUSTER LOCK

This invention relates in general to vehicle braking systems, and more particularly to a portable slack adjuster lock for positively locking the slack adjuster worm shaft found in the braking systems of large vehicles such as trucks or tractor trailer rigs which use manually adjustable slack adjusters.

The axle of a vehicle such as a truck, typically has a brake drum mounted thereon, including a hub with studs for receiving a wheel. A splined brake operating shaft projects inwardly from the rear side of the brake drum, and a slack adjuster arm extends from the shaft to mechanical or hydraulic means mounted on the axle. The mechanical or hydraulic means are pivotally connected to the upper end of the slack adjuster arm for causing actuation of the brake by rotating the shaft.

The slack adjuster arm is shaped at its lower end to provide a housing which rotates to receive a worm gear. The worm gear has an internally splined bore which fits into complementary splines on the shaft. Further towards its upper end, the housing portion of the arm rotatably receives a worm fastened on a shaft and which meshes with the worm gear.

During the course of normal use of a large vehicle such as a truck, a certain amount of play may develop in the linkage connecting the hydraulic means to the brakes, requiring frequent adjustment. To this end, the slack adjuster is provided with a nut-like portion extending from the housing for receiving an adjusting tool such as a wrench, for rotating the worm, thereby rotating the shaft and taking up any slack in the linkage.

Slack adjusters for use in braking systems are well known. U.S. Pat. Nos. 2,536,410 (Anderson); 3,361,230 (Hilderbrand et al), and 4,121,703 (Moss), relate to such well known automatic slack adjusters, and form a general survey of the background prior art relevant to the present invention.

Various apparatus and methods have been suggested according to the prior art, for preventing manual slack adjusters from becoming loosened after being set to a desired position. As discussed above, for various reasons (such as normal wear and tear, vibration, subjection to dirt and foreign matter, etc.), the worm and worm gear of the well known slack adjusters tend to shift from the desired position, resulting in a maladjusted brake.

For example, U.S. Pat. Nos. 3,227,247 (Sherretts et al); 2,536,410 (Anderson); and 3,570,632 (Williams, W. J.) each disclose braking systems and associated adjustment mechanisms to vary the effective length of a plunger for engaging brake shoes within a brake drum, in response to actuation by hydraulic or mechanical means.

The patent of Anderson teaches the structure of braking systems, and more particularly discloses an adjuster located between the end of a brake shoe and an actuator arranged to operate the shoe, internally of the brake drum.

The patents of Sherretts et al and Williams, W. J., disclose a special locking retainer for installation between an end of a brake shoe web, and the abutting outer end of a threaded stud rotatably carried by an actuator internally of the drum.

U.S. Pat. Nos. 3,602,342 (Whittle); 2,402,828 (Michael), and 2,558,115 (Williams, H. J.), disclose manual locking means for preventing relative movement of the worm gear and worm of a slack adjuster. In particular, the patents of Whittle and Williams, H. J., disclose mechanical means operating internally of the slack adjuster, whereas the patent of Michael discloses mechanical apparatus for application externally of the slack adjuster to lock the worm and worm gear in place.

The devices disclosed in the patents of Whittle and Williams, H. J. suffer from the disadvantage of requiring specially designed slack adjusters. For example, the device of Whittle teaches a split worm gear and split housing clamped together by bolts, while the device of Williams, H. J. utilizes a specially designed bore within the slack adjuster body for receiving a coil spring and special sleeve block. Thus, neither of the devices of Williams, H. J. or Whittle can be utilized with standard slack adjusters.

The Michael device comprises complex mechanical apparatus in the form of a disk for attachment to the adjusting nut by means of a removable cotter pin, and fitting over a grease fitting mounted on the slack adjuster housing. In order to adjust slack in the braking system, the grease fitting must be unscrewed from the slack adjuster housing and removed in order that the disk may be rotated to adjust the nut. Then, the grease fitting is reinserted through a hole in the disk and screwed back into the housing.

The device of Michael suffers from numerous problems. First of all, because the braking system is subject to constant vibration and stress, the cotter pin can be inadvertently broken or vibrated loose, resulting in loss of the slack adjuster set point and possible loss or damage to the disk. Furthermore, slack adjustment of the brakes is tedious and time consuming, requiring careful unscrewing of the grease fitting, rotation of the disk and reinsertion of the fitting, while ensuring that none of the fitting, disk or cotter pin are dropped and lost. Such an exacting slack adjustment procedure is typically time consuming and prone to error, (i.e. the fitting can be accidentally screwed into the housing at an incorrect angle, thereby shearing the threads, etc.). Furthermore, in the event that the slack adjuster is not provided with a grease fitting, the device of Michael is entirely unoperative.

According to the present invention, a C-shaped spring metal clamp is provided having a back portion shaped to accommodate the surface bosses of a slack adjuster, and top and bottom portions being provided with hexagonal apertures or holes, preferably of different sizes, for engaging and locking the adjusting nut of the slack adjuster. The lock according to the present invention simply clips onto the slack adjuster housing, over the adjusting nut, thereby securing the nut at a desired set point or position. Because the lock is of unitary construction, there is little risk of dropping and loosing important parts such as cotter pins, disks, grease fitting, coil springs, etc., while adjusting the slack. Because the lock is of simple and resilient construction there is also little risk of damage due to vibration and normal wear and tear.

Whereas the prior art patents of Anderson, Sherretts et al and Williams, W. J. disclose locking retainers for operation internally of the drum, the lock according to the present invention is applied to the slack adjuster itself, externally of the braking system. Thus, complicated disassembly and reassembly of the braking system to effect slack adjustment, is not required.

Also, whereas the patents of Whittle, Williams, H. J. and Michael each require specially designed slack adjusters, the lock according to the present invention is designed for use with standard slack adjusters found in most vehicle braking systems.

The lock according to the present invention is thus characterized by low cost, simple unitary construction, portability, ruggedness, resiliency, and easy installation and removal, in contrast with prior art approaches.

Figure 2:
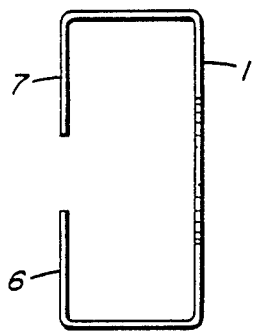
Figure 3:
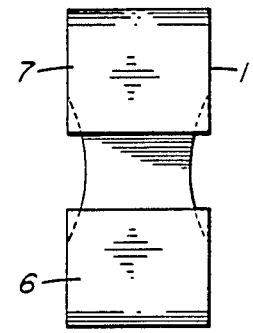
Figure 4:
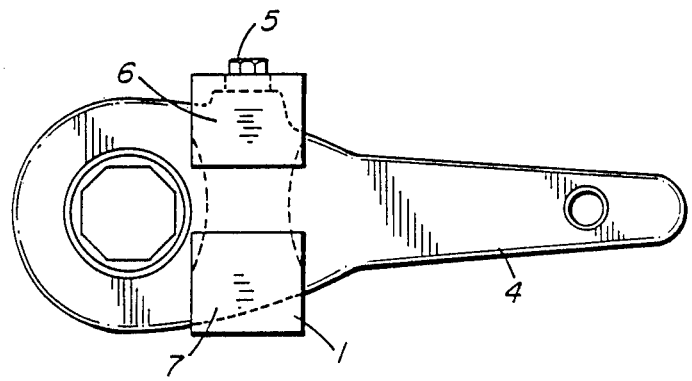

A better understanding of the invention will be obtained with reference to the detailed description below in combination with the following drawings in which:

FIG. 1 is a right side, top and rear perspective view of a slack adjuster lock in accordance with a preferred embodiment of the present invention, FIG. 2 is a right side view of the slack adjuster lock, FIG. 3 is a front elevation view of the slack adjuster lock, and FIG. 4 is a front view of the slack adjuster lock mounted on a standard manually adjustable slack adjuster.

The slack adjuster lock 1, according to the preferred embodiment of the present invention, is in the form of a C-shaped clamp preferably made of spring type banding steel. Hexagonal apertures or holes 2 and 3 are disposed in top and bottom end portions of the lock, and are dimensioned to match the corresponding sizes of the hexagonal shaped adjusting nut 5 of a standard slack adjuster 4 (FIG. 4).

The slack adjuster lock 1 is installed by simply sliding over the slack adjuster 4 and clipping over the adjusting nut 5. Oppositely disposed hook portions 6 and 7 wrap around the slack adjuster housing to secure the lock thereon. The hook portions 6 and 7 are spread slightly apart for passing over the nut 5 during installation and removal of the lock, and due to the resilient spring type construction, the hook portions spring back together with the nut projecting through the aperture 2 (or 3). Once clamped onto the slack adjuster 4, over the adjusting nut 5, the lock 1 prevents rotation of the adjusting nut in order to maintain the desired set point of the adjusted brakes.

According to a successful prototype of the invention, the rear portion of the C-shaped lock 1 was approximately 94 mm in length, and curved to accommodate correspondingly shaped bosses on the housing. The top and bottom end portions were 33 mm each, and the hook portions 6 and 7 were each approximately 10 mm.

The apertures 2 and 3 are preferably 9/16 inch and ⅝ inch six-sides holes respectively, conforming to the standard sizes of the corresponding adjusting nut 5 on the slack adjuster.

By using the lock according to the present invention, it is expected that the life of a slack adjuster would typically be extended until such time as major brake relining is required, thereby saving trucking companies from the expenses associated with premature repairs of the slack adjuster. Use of the lock is also expected to eliminate the need for truck drivers to set brakes several times during the course of a trip.

Hence, the lock according to the present invention can be installed and removed very quickly as a result of the unitary and resilient construction. This is in direct contrast to the prior art locks of Michael, Sherretts et al and Williams, W. J. which typically required careful and tedious installation and removal.

Furthermore, the lock according to the present invention is portable such that a vehicle operator may apply the device to the manual slack adjuster as required, and can remove the device when the vehicle is not in use, in contrast with the prior art locks of Whittle and Williams, W. J., which operate internally of the slack adjuster, requiring disassembly of the brake system for insertion and removal of the lock.

A person understanding the present invention may conceive of other embodiments or variations therein.

For example, while the lock 1 is preferably made of banding steel, it may instead be fabricated from plastic or other resilient material. Also, the hexagonal apertures or holes 2 and 3 can be any suitable size for locking the adjusting nut 5 of a slack adjuster. For example, 7/16 inch or other convenient sizes may be used.

These and other embodiments or modifications are considered to be within the sphere and scope of the present invention as defined in the claims appended hereto.

I claim:

1. In a manual slack adjuster for vehicle braking systems, comprised of a lever portion, a housing, an internal worm gear disposed within said housing and an adjusting nut connected to said worm gear and projecting from said housing; a portable slack adjuster lock for locking said adjusting nut in a predetermined position, comprised of a generally C-shaped clamp for clipping onto said housing, said clamp being provided with oppositely disposed hook portions for gripping said housing, and an aperture disposed within an end portion of said clamp corresponding in shape and size to the shape and size of said adjusting nut, for receiving and thereby locking said adjusting nut in said predetermined position.

2. A lock as defined in claim 1, said clamp being provided with a pair of hexagonal apertures in opposite end portions thereof, each of said apertures being of different size for accommodating different sizes of hexagonal shaped adjusting nuts.

3. A lock as defined in claim 2, wherein said clamp is fabricated from spring banding steel.

4. A lock as defined in claim 2, wherein at least one of said hexagonal apertures has a diameter of 7/16 inches.

5. A lock as defined in claim 2, wherein at least one of said hexagonal apertures has a diameter of 9/16 inches.

6. A lock as defined in claim 2, wherein at least one of said hexagonal apertures has a diameter of ⅝ inches.

7. A lock as defined in claim 1, having a back portion thereof shaped to accommodate surface bosses of said slack adjuster.

8. A lock as defined in claim 1, including a back portion having a length of approximately 94 mm, opposite end portions each having a width of approximately 33 mm, and hook portions extending inwardly from said end portions, each having a length of approximately 10 mm.

9. A lock as defined in claim 1, fabricated from resilient plastic.

10. For use with a manual slack adjuster comprised of a lever portion, a housing, an internal worm gear disposed within said housing and a hexagonal shaped adjusting nut connected to said worm gear and projecting from said housing, a method of locking said adjusting nut by means of a portable slack adjuster lock comprised of a generally C-shaped clamp having a back portion, a pair of opposite end portions extending at right angles from said back portion, opposite faced hook portions connected to said end portions, and a hexagonal shaped aperture in at least one of said end portions, shaped to receive said adjusting nut, said method comprising the steps of:

(a) bending apart said hook portions of said C-shaped clamp, (b) passing said hook and end portions of said clamp over said slack adjuster, (c) aligning said aperture with said adjusting nut, and (d) releasing said clamp such that said hook and end portions contact said housing with said nut projecting through said aperture, thereby clamping said lock around said housing and locking said nut within said aperture.

11. In a manual slack adjuster for vehicle braking systems, comprised of a lever portion, a housing, an internal worm gear disposed within said housing, and a hexagonal shaped adjusting nut connected to said worm gear and projecting outwardly from said housing; a lock for maintaining said adjusting nut in a predetermined position, comprised of a C-shaped clamp for clipping onto said housing, including a rear portion; top and bottom end portions; a pair of oppositely disposed hook portions; and a hexagonal shaped aperture in at least one of said end portions, adapted to receive and secure said adjusting nut in response to said clamp being clipped onto said housing, whereby said nut and consequently said worm gear are locked in a fixed position.

12. A lock as defined in claim 3, wherein at least one of said hexagonal apertures has a diameter of 7/16 inches.

13. A lock as defined in claim 3, wherein at least one of said hexagonal apertures has a diameter of 9/16 inches.

14. A lock as defined in claim 3, wherein at least one of said hexagonal apertures has a diameter of ⅜ inches.

15. A lock as defined in claim 2, having a back portion thereof shaped to accommodate surface bosses of said slack adjuster.

16. A lock as defined in claim 3, having a back portion thereof shaped to accommodate surface bosses of said slack adjuster.

17. A lock as defined in claim 2, including a back portion having a length of approximately 94 mm, opposite end portions each having a width of approximately 33 mm, and hook portions extending inwardly from said end portions, each having a length of approximately 10 mm.

18. A lock as defined in claim 3, including a back portion having a length of approximately 94 mm, opposite end portions each having a width of approximately 33 mm, and hook portions extending inwardly from said end portions, each having a length of approximately 10 mm.

19. A lock as defined in claim 2, fabricated from resilient plastic.

* * * * *